United States Patent
Diedrich et al.

(10) Patent No.: US 9,998,695 B2
(45) Date of Patent: Jun. 12, 2018

(54) AUTOMOTIVE IMAGING SYSTEM INCLUDING AN ELECTRONIC IMAGE SENSOR HAVING A SPARSE COLOR FILTER ARRAY

(71) Applicant: Ford Global Technologies, LLC, Dearborn, MI (US)

(72) Inventors: Jonathan Diedrich, Carleton, MI (US); Adil Nizam Siddiqui, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 278 days.

(21) Appl. No.: 15/010,698

(22) Filed: Jan. 29, 2016

(65) Prior Publication Data

US 2017/0223288 A1    Aug. 3, 2017

(51) Int. Cl.
| | | |
|---|---|---|
| *H04N 5/357* | (2011.01) | |
| *B60R 1/00* | (2006.01) | |
| *G06T 3/40* | (2006.01) | |
| *G06T 5/00* | (2006.01) | |
| *H04N 7/18* | (2006.01) | |
| *H04N 5/225* | (2006.01) | |
| *H04N 5/235* | (2006.01) | |
| *H04N 9/04* | (2006.01) | |

(52) U.S. Cl.
CPC ............. *H04N 5/3572* (2013.01); *B60R 1/00* (2013.01); *G06T 3/4015* (2013.01); *G06T 5/001* (2013.01); *H04N 5/2254* (2013.01); *H04N 5/2353* (2013.01); *H04N 7/183* (2013.01); *H04N 9/045* (2013.01)

(58) Field of Classification Search
CPC .................................................... H04N 5/3572
See application file for complete search history.

(56) References Cited

U.S. PATENT DOCUMENTS

| | | |
|---|---|---|
| 6,476,865 B1 | 11/2002 | Gindele et al. |
| 7,952,624 B2 | 5/2011 | Inokuma |
| 2006/0119738 A1 | 6/2006 | Kido |
| 2009/0195681 A1* | 8/2009 | Compton ........... H04N 5/23245 348/308 |

(Continued)

FOREIGN PATENT DOCUMENTS

| | | |
|---|---|---|
| WO | WO 03096673 A2 | 11/2003 |
| WO | WO 2008069920 A1 | 6/2008 |
| WO | WO 2015045913 A1 | 4/2015 |

OTHER PUBLICATIONS

Panasonic Develops Technology for Highly Sensitive Image Sensors Using Micro Color Splitters [online], Panasonic, Feb. 4, 2013, retrieved on Jan. 28, 2016 from http://news.panasonic.com/press/news/official.data/data.dir/2013/02/en130204-6/en130204-6.html.

(Continued)

*Primary Examiner* — James Pontius
(74) *Attorney, Agent, or Firm* — James P. Muraff; Neal, Gerber & Eisenberg LLP

(57) ABSTRACT

Various embodiments of the present disclosure provide an automotive imaging system including an electronic image sensor having a sparse color filter array (CFA). The use of a sparse CFA results in: (1) improved image quality; and/or (2) cost savings by enabling use of a less complex, cheaper lens without any or any substantial reduction in image quality.

20 Claims, 4 Drawing Sheets

(56) References Cited

U.S. PATENT DOCUMENTS

| | | |
|---|---|---|
| 2010/0157126 A1* | 6/2010 | Compton ............. H04N 5/3458 |
| | | 348/311 |
| 2011/0115954 A1 | 5/2011 | Compton |
| 2011/0211109 A1 | 9/2011 | Compton et al. |
| 2014/0267851 A1* | 9/2014 | Rhoads ............. H01L 27/14647 |
| | | 348/294 |
| 2015/0029358 A1 | 1/2015 | Kaizu |
| 2015/0286059 A1 | 10/2015 | Yun et al. |
| 2015/0286060 A1 | 10/2015 | Roh et al. |
| 2016/0286097 A1* | 9/2016 | Singh .................... H04N 1/648 |

OTHER PUBLICATIONS

TRUESENSE Sparse Color Filter Pattern, ON Semiconductor, AND9180/D, retrieved Jan. 28, 2016 from http://www.onsemi.com/pub_link/Collateral/AND9180-D.PDF.

Search Report dated Jul. 14, 2017 for GB Patent Application No. GB 1701408.5 ( 4 pages).

* cited by examiner

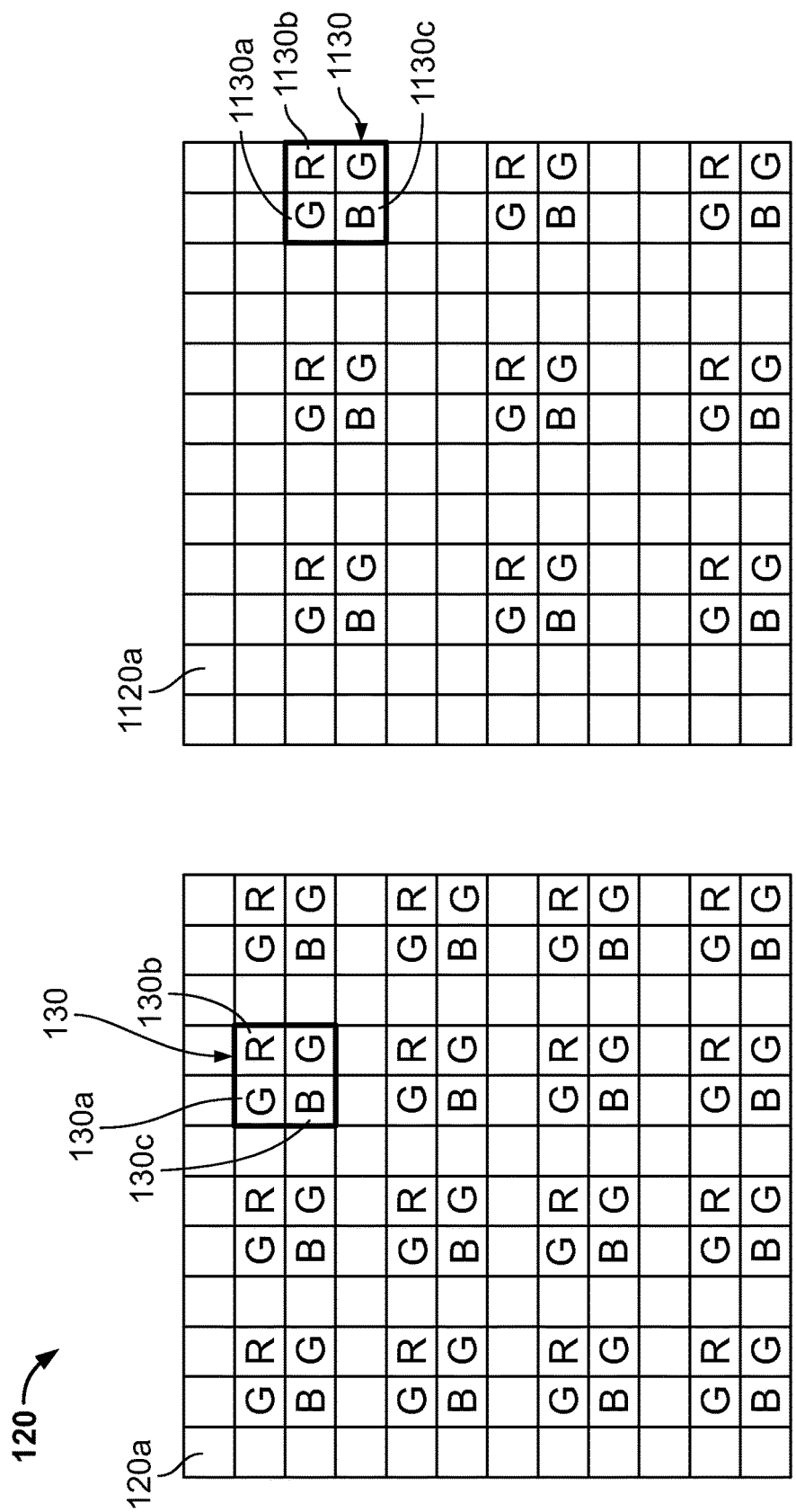

AUTOMOTIVE IMAGING SYSTEM INCLUDING AN ELECTRONIC IMAGE SENSOR HAVING A SPARSE COLOR FILTER ARRAY

TECHNICAL FIELD

The present disclosure generally relates to an automotive imaging system. More particularly, the automotive imaging system includes a camera having a lens and an electronic image sensor having a sparse color filter array.

BACKGROUND

Cameras typically used in known automotive imaging systems include an electronic image sensor, such as an active pixel sensor (APS) made using a complementary metal-oxide semiconductor (CMOS) process or a charge coupled device (CCD). This known electronic image sensor includes a plurality of light-sensitive pixels typically arranged in a matrix of rows and columns. FIG. 1A shows one example prior art electronic image sensor 12 including 144 pixels 12a arranged in a 12×12 matrix. In operation, circuitry of this known electronic image sensor converts light incident on a pixel into digital image data. A controller converts the image data into an image displayable on a display device.

To capture color data and enable creation of color images, these known electronic image sensors include a Bayer Color Filter Array (CFA). The Bayer CFA includes red, green, and blue color filters disposed or formed over the pixels (one per pixel) in a repeating pattern. FIG. 1B shows the prior art electronic image sensor 12 including a Bayer CFA including a repeating mosaic 13 of two green filters 13a, one red filter 13b, and one blue filter 13c. In operation, each colored filter only permits light of a particular wavelength (red, green, or blue in this case) to reach its pixel, which provides color information to the electronic image sensor. The controller uses a demosaicing algorithm to reconstruct the full-color image using this color information.

Since each color filter only permits light of particular wavelength to reach its pixel, about two-thirds less light reaches each filtered pixel than if that pixel was unfiltered. Use of a Bayer CFA—where each pixel is filtered—results in significantly reduced light sensitivity. This in turn results in a color image of inferior quality compared to a monochrome image obtained using an unfiltered electronic image sensor. This problem is exacerbated during use in low-light situations. For instance, the color image may have increased noise, aliasing, reduced spatial resolution, and reduced image sharpness caused by the reduced light sensitivity or the post-processing techniques used to account for the reduced light sensitivity.

There is a need for new automotive imaging systems that solve these problems.

SUMMARY

The appended claims define this application. The specification summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments provide an automobile and an automotive imaging system for the automobile. According to one embodiment, an automobile comprises a frame; and an imaging system supported by the frame and including: a camera including a lens and an image sensor having a sparse color filter array, the camera configured to generate image data based on light incident on the sensor, the lens having an f-stop higher than f/2.4; a controller configured to generate an image using the image data; and a display device configured to display the image.

According to another embodiment, an automobile imaging system comprises a camera including a lens and an image sensor having a sparse color filter array, the camera configured to generate image data based on light incident on the sensor, the lens having an f-stop higher than f/2.4; a controller configured to generate an image using the image data; and a display device configured to display the image.

BRIEF DESCRIPTION OF THE DRAWINGS

For a better understanding of the invention, the detailed description references embodiments shown in the following drawings. The components in the drawings are not necessarily to scale and related elements may be omitted to emphasize and clearly illustrate the novel features described herein. In addition, system components can be variously arranged, as known in the art. In the drawings, like referenced numerals may refer to like parts throughout the different drawings unless otherwise specified.

FIGS. 3A, 3B, and 3C show different embodiments of electronic image sensors having different types of sparse CFAs.

DETAILED DESCRIPTION OF EXAMPLE EMBODIMENTS

Automotive Imaging System Including an Electronic Image Sensor Having a Sparse Color Filter Array While the automotive imaging system of the present disclosure may be embodied in various forms, the drawings show and this specification describes some exemplary and non-limiting embodiments of the automotive imaging system. The present disclosure is an exemplification of the automotive imaging system and does not limit the automotive imaging system to the specific illustrated and described embodiments. Not all of the depicted or described components may be required, and some embodiments may include additional, different, or fewer components. The arrangement and type of components may vary without departing from the spirit or scope of the claims set forth herein.

Various embodiments of the automotive imaging system of the present disclosure (sometimes referred to as the "imaging system" for brevity) include an electronic image sensor having a sparse CFA. Depending on the implementation, use of a sparse CFA as opposed to a Bayer CFA results in: (1) an improved image quality; and/or (2) cost savings by enabling use of a less complex, cheaper lens without any or any substantial reduction in image quality.

1. Automobile Imaging System Components

Figure 1B:
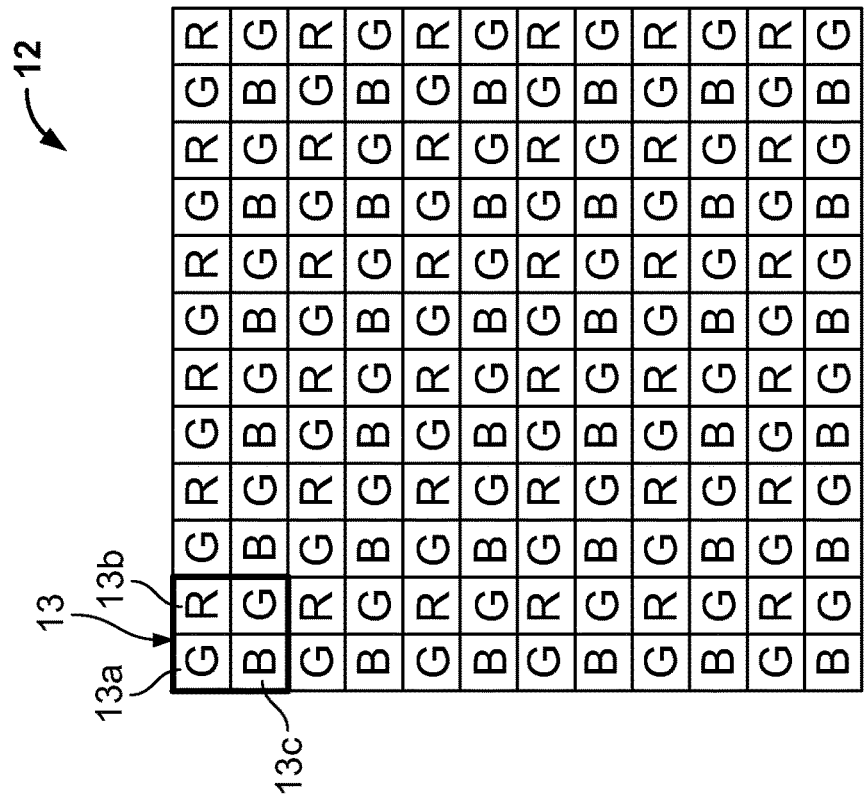
FIG. 1B shows the electronic image sensor of FIG. 1B with a Bayer CFA.
Figure 1A:
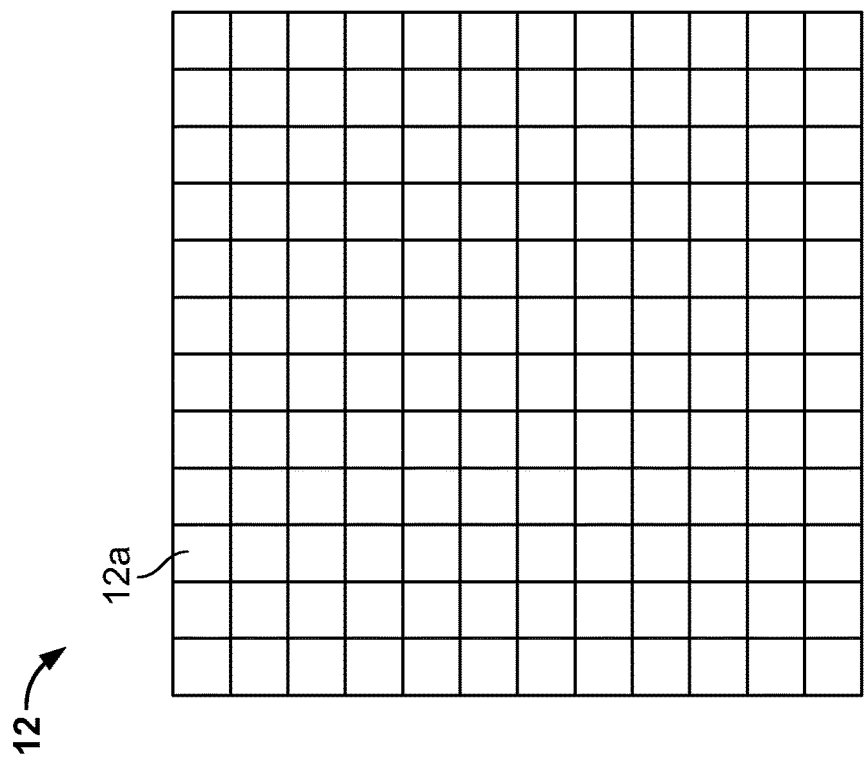
FIG. 1A shows a prior art electronic image sensor.
Figure 2:
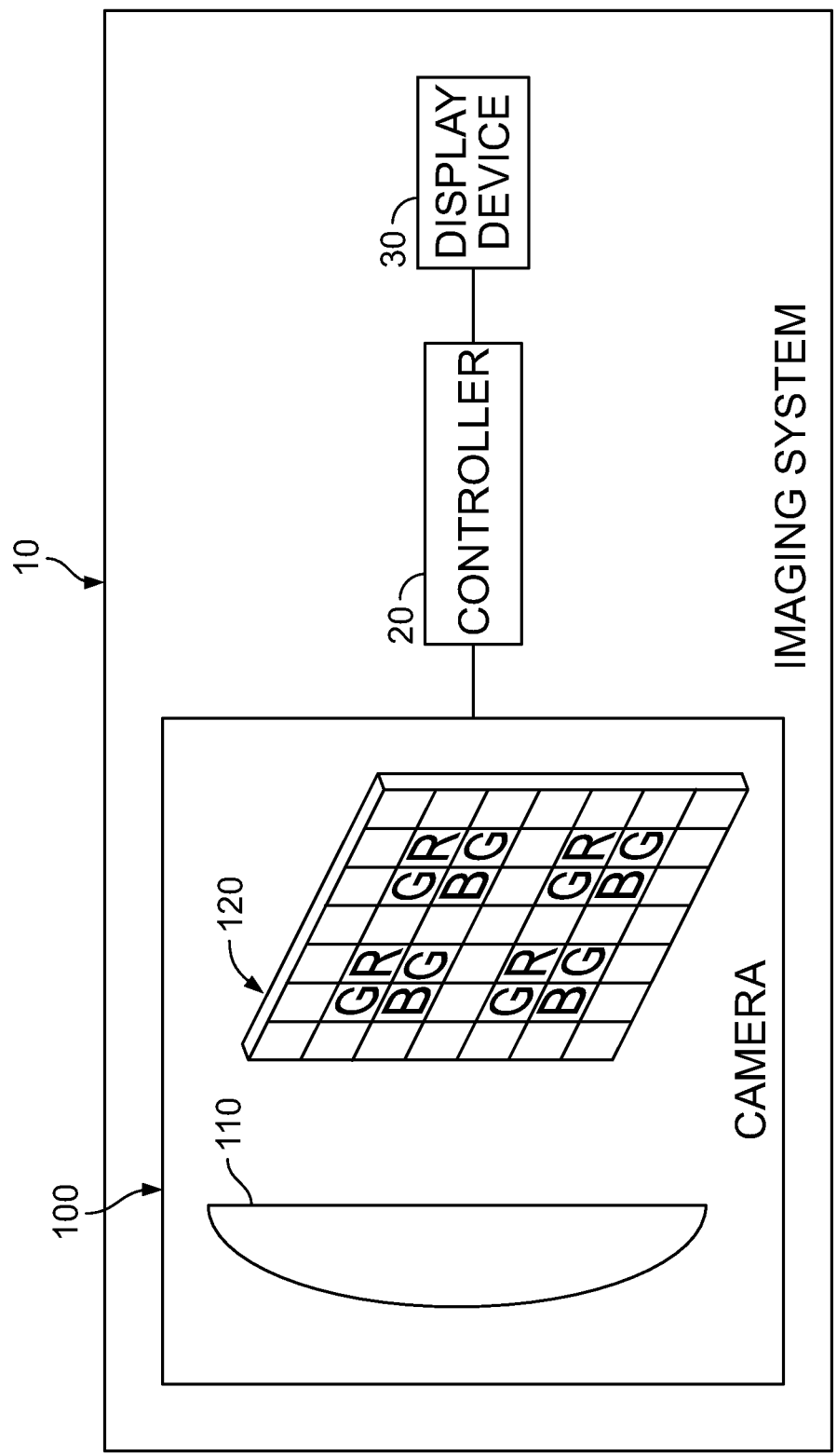
FIG. 2 is a block diagram of one example embodiment of the automotive imaging system of the present disclosure.

FIG. 2 is a block diagram of one example embodiment of an automotive imaging system 10 of the present disclosure. In this example embodiment, the automotive imaging system 10 is supported by a frame of an automobile, though in other embodiments the vehicle may be any suitable vehicle (such as a truck, a watercraft, or an aircraft). The automotive imaging system 10 includes: a camera 100, a controller 20, and a display device 30. The camera 100 and the display device 30 are electrically connected to the controller 20 such that the controller 20 can send signals to and receive signals from these components (and vice-versa).

The camera 100 may be any suitable camera including a lens 110 and an electronic image sensor 120. The lens 110 may be any suitable lens, such as (but not limited to) a rectilinear lens or an automotive fisheye lens (also called a wide field-of-view lens). The lens may be a fixed-aperture lens or a variable-aperture lens. The electronic image sensor 120 may be any suitable electronic image sensor—such as an APS or a CCD—including a plurality of pixels 120a arranged in a matrix of rows and columns. The electronic image sensor 120 is positioned relative to the lens 110 such that the lens focuses incident light onto the pixels 120a.

The electronic image sensor includes a sparse CFA (SCFA) that includes fewer color filters than a Bayer CFA of the same pixel density. Holding other factors constant, using the SCFA increases the amount of light that reaches the pixels as compared to a Bayer CFA.

As shown in FIG. 3A, in this embodiment the electronic image sensor 120 includes a 3×3 SCFA having a repeating mosaic 130 of two green filters 130a, one red filter 130b, and one blue filter 130c. In the 3×3 SCFA, the mosaics 130 are arranged in a pattern such that one row or column of unfiltered pixels 120 separates neighboring mosaics 130 from one another.

FIG. 3B shows another embodiment of an electronic image sensor 1120 including a 4×4 SCFA having a repeating mosaic 1130 of two green filters 1130a, one red filter 1130b, and one blue filter 1130c. In the 4×4 SCFA, the mosaics 1130 are arranged in a pattern such that two rows or column of unfiltered pixels 1120 separate neighboring mosaics 1130 from one another.

Figure 3C:
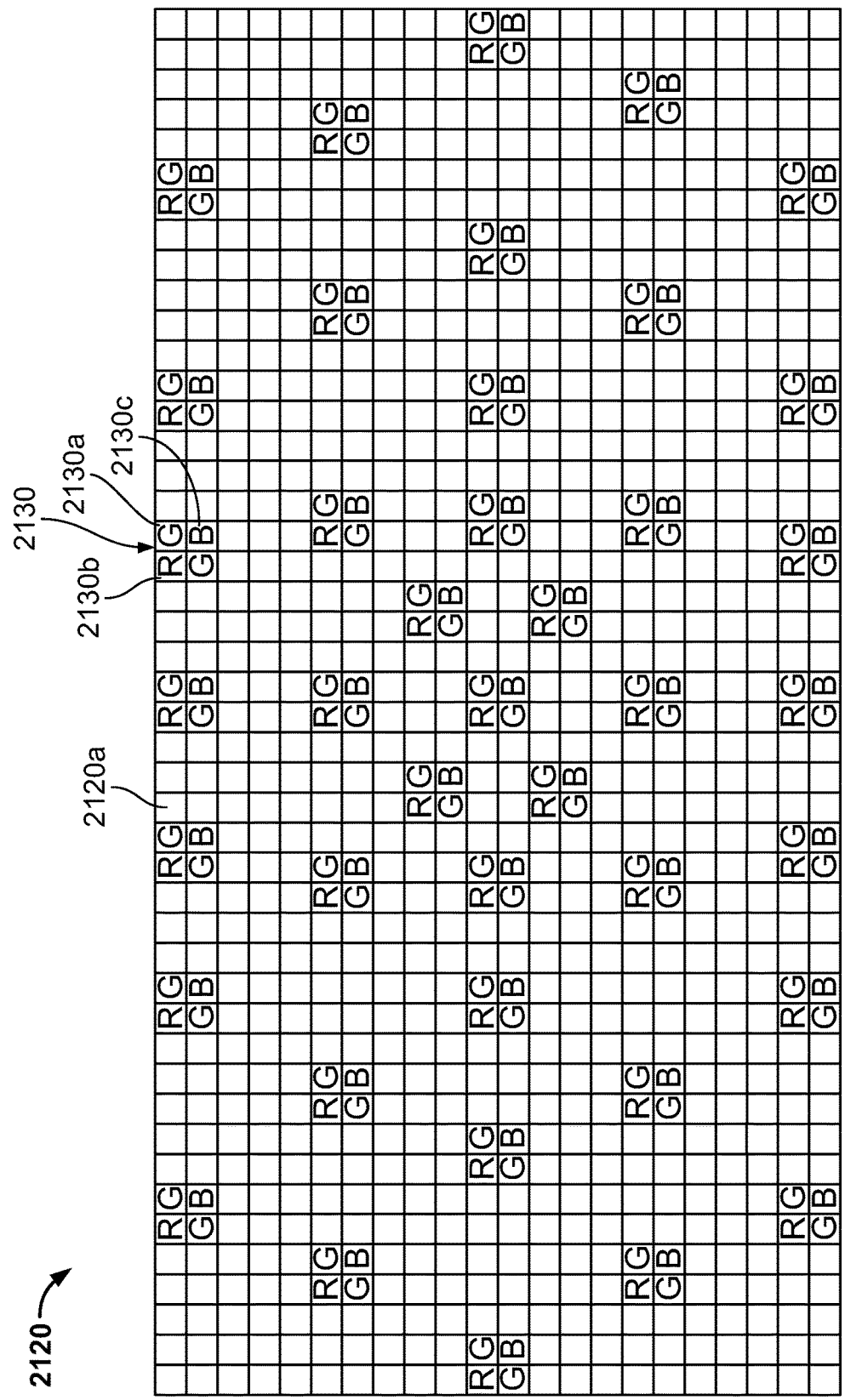

FIG. 3C shows another embodiment of an electronic image sensor 2120 including a fisheye SCFA having a repeating mosaic 2130 of two green filters 2130a, one red filter 2130b, and one blue filter 2130c. In the fisheye SCFA, the mosaics 2130 are arranged in a pattern such that the mosaics 2130 are spaced close together near the horizontal and vertical center of the electronic image sensor 2120 and are spaced farther apart moving away from the center. This results in a high concentration of mosaics near the center of the electronic image sensor and a low concentration of mosaics near the edges of the electronic image sensor. This spacing corresponds to the unique field-of-view of a fisheye lens.

These three SCFAs are merely examples, and the electronic image sensor may include any suitable SCFA having any suitable mosaics arranged in any suitable patterns, having any suitable color filters, and having any suitable quantity of filters, so long as certain pixels remain unfiltered.

The controller 20 includes at least one processor in communication with a memory that stores a set of instructions. The processor is configured to communicate with the memory, access the set of instructions, and execute the set of instructions to cause the imaging system 10 to perform any of the methods, processes, and features described herein.

The processor may be any suitable processing device or set of processing devices such as, but not limited to: a microprocessor, a microcontroller-based platform, a suitable integrated circuit, or one or more application-specific integrated circuits (ASICs) configured to execute the set of instructions. The memory may be any suitable memory device such as, but not limited to: random-access memory (RAM), which can include non-volatile RAM, magnetic RAM, ferroelectric RAM, and any other suitable forms; disk memory; a hard disk drive (HDD); a solid state drive (SSD); FLASH memory; EPROMs; EEPROMs; memristor-based non-volatile solid-state memory; unalterable memory; or read-only memory.

The display device 30 may be any suitable display device configured to display images generated by the controller 20, such as (but not limited to) a liquid crystal display (LCD) or an organic light emitting diode (OLED). The display device 30 may be any suitable size and any suitable shape, and may be positioned in any suitable location within the automobile. In one embodiment, the display device is part of the automobile's infotainment system.

2. Operation

To generate and display an image using the automotive imaging system 10, the camera 100 first exposes the electronic image sensor 120 (and particularly the pixels 120a) to incident light (via the lens 110) for a period of time called the integration time. The camera 100 does so by opening its shutter, holding the shutter open for the integration time, then closing the shutter. The shutter may be electronic or mechanical. Circuitry of the electronic image sensor 120 converts the light incident on the pixels into digital image data and sends that image data to the controller 20. The controller 20 converts the image data into an image—at least partially by using a demosaicing algorithm as known in the art to reconstruct color—and sends the image to the display device 30 for display.

3. F-Stop and Integration Time

As known in the art, a camera lens has an f-stop (sometimes called an f-number, focal ratio, or f-ratio) that represents the ratio of the lens's focal length to the diameter of the lens's entrance pupil. The smaller the f-stop, the larger the aperture and the more light passes through the lens, and vice-versa. For instance, the aperture of an f/1.4 lens is larger than the aperture of an f/8 lens. Lenses with larger f-stops (smaller apertures) have better depth-of-focus than those with smaller f-stops (larger apertures), which is beneficial for applications in which it is desirable that the resulting images convey depth. Lenses with smaller f-stops (larger apertures) are more complex than lenses with larger f-stops (smaller apertures), which means they are housed in larger casings or housings than those with larger f-stops (smaller apertures).

Generating an image of acceptable quality requires balancing three main factors: (1) the lens's f-stop, (2) the integration time, and (3) the type of CFA (if any) of the electronic image sensor.

Table 1 below shows, for each of a plurality of f-stops and for four types of CFAs (none, 4×4 SCFA, 3×3 SCFA, and Bayer CFA), the percentage of incident light reaching the pixels of the electronic image sensor, normalized to f/2.4 and assuming a 30 millisecond integration time.

TABLE 1

| | | f-stop | | | | | | |
|---|---|---|---|---|---|---|---|---|
| | | 1.4 | 2 | 2.4 | 2.8 | 4 | 5.6 | 8 |
| Type of CFA | None (Unfiltered) | 280 | 140 | 100 | 70 | 35 | 17.5 | 8.75 |
| | 4 × 4 SCFA | 240.8 | 120.4 | 86 | 60.2 | 30.1 | 15.05 | 7.53 |
| | 3 × 3 SCFA | 193.2 | 96.6 | 69 | 48.3 | 24.15 | 12.08 | 6.04 |
| | Bayer CFA | 99.33 | 46.67 | 33.33 | 23.33 | 11.67 | 5.83 | 2.92 |

Percentage of incident light reaching pixels
(normalized to f/2.4 and assuming 30 ms integration time)

Table 2 below shows, for each of a plurality of integration times and for four types of CFAs (none, 4×4 SCFA, 3×3 SCFA, and Bayer CFA), the percentage of incident light reaching the pixels of the electronic image sensor, normalized to any particular f-stop.

TABLE 2

| | | Integration Time (ms) | | | |
|---|---|---|---|---|---|
| | | 30 | 15 | 7.5 | 3.25 |
| Type of CFA | None (Unfiltered) | 100 | 50 | 25 | 12.5 |
| | 4 × 4 SCFA | 86 | 43 | 21.5 | 10.75 |
| | 3 × 3 SCFA | 69 | 34.5 | 17.25 | 8.63 |
| | Bayer CFA | 33.33 | 16.67 | 8.33 | 4.17 |

Percentage of incident light reaching
pixels (normalized to any f-stop)

Typical known automotive imaging systems include an electronic image sensor with a Bayer CFA, have an f/2.4 lens, and use an integration time of 30 milliseconds. This results in 33.33% of incident light reaching the pixels of the electronic image sensor.

As indicated by Tables 1 and 2, by using an electronic image sensor with the 3×3 SCFA or the 4×4 SCFA of the present disclosure and holding the integration time and f-stop constant (30 milliseconds and f/2.4 in this example embodiment), one can increase the quality of the image ultimately generated by the controller as compared to that generated when the Bayer CFA is used. Using the 3×3 SCFA increases the percentage of incident light reaching the pixels of the electronic image sensor more than 2 times to 69%, and using the 4×4 SCFA increases the percentage of incident light reaching the pixels of the electronic image sensor more than 2.5 times to 86%. Since the integration time and f-stop do not change, more light reaching the pixels will result in a better-quality image. This also improves performance in low-light scenarios. Since more light reaches the pixels when an electronic image sensor with the 3×3 SCFA or the 4×4 SCFA is used, the automotive imaging system can operate acceptably in low-light scenarios and does not, in certain instances, require the automobile to generate its own light source to provide an acceptable amount of ambient light.

As indicated by Table 1, by using an electronic image sensor with the 3×3 SCFA or the 4×4 SCFA of the present disclosure and holding the integration time constant (30 milliseconds in this example embodiment), one can use a higher f-stop as compared to the f-stop used with the Bayer CFA without any or any substantial decrease in image quality. For example, using an electronic image sensor with the 3×3 SCFA combined with a f/2.8 lens—one f-stop higher than the f/2.4 lens used with the Bayer CFA—results in 48.3% of incident light reaching the pixels of the electronic image sensor. In this instance, using a less complex lens with a higher f-stop results in a more compact camera, and more light reaching the pixels than the typical automotive imaging systems described above. And since the integration time doesn't change, more light reaching the pixels results in a higher quality image. Further, a higher f-stop provides a larger depth-of-focus and therefore a sharper image across the image plane.

In another example, using an electronic image sensor with the 4×4 SCFA combined with a f/4 lens—two f-stops higher than the f/2.4 lens used with the Bayer CFA—results in 30.1% of incident light reaching the pixels of the electronic image sensor. In this instance, using a less complex lens with a higher f-stop results in a more compact camera and about the same amount of light reaching the pixels as the typical automotive imaging systems described above. Accordingly, image quality will not substantially worsen, but a less complex, cheaper, and smaller lens may be used. Further, a higher f-stop provides a larger depth-of-focus and therefore a sharper image across the image plane.

As indicated by Table 2, by using an electronic image sensor with the 3×3 SCFA or the 4×4 SCFA of the present disclosure and holding the f-stop constant (f/2.4 in this example embodiment), one can use a lower integration time as compared to the integration time used with the Bayer CFA and increase image quality. For example, using an electronic image sensor with the 3×3 SCFA and a 15 millisecond integration time—half that used with the Bayer CFA—results in 34.5% of incident light reaching the pixels of the electronic image sensor. In this instance, decreasing the integration time results in a sharper, better-quality image. And since the f-stop doesn't change, more light reaching the pixels also results in a higher quality image.

In another example, using an electronic image sensor with the 4×4 SCFA and a 15 millisecond integration time—half that used with the Bayer CFA—results in 43% of incident light reaching the pixels of the electronic image sensor. In this instance, decreasing the integration time results in a sharper, better-quality image. And since the f-stop doesn't change, more light reaching the pixels also results in a higher quality image.

It should therefore be appreciated that one can choose an f-stop, integration time, and type of SCFA to generate a sharper image, improved light uniformity across the entire image (reduced vignetting), improved color reproduction, improved signal-to-noise ration, and improved dynamic range and tone reproduction.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. An automobile comprising:
   a frame; and
   an imaging system supported by the frame and including:
   a camera including a lens and an image sensor having a sparse color filter array, the camera configured to generate image data based on light incident on the sensor, the lens having an f-stop higher than f/2.4;
   a controller configured to generate an image using the image data; and
   a display device configured to display the image.

2. The automobile of claim 1, wherein an integration time of the camera is about 30 milliseconds or less.

3. The automobile of claim 1, wherein the f-stop of the lens is higher than f/2.8.

4. The automobile of claim 3, wherein the sparse color filter array is a 4×4 sparse color filter array and an integration time of the camera is about 30 milliseconds.

5. The automobile of claim 4, wherein the f-stop of the lens is f/4.

6. The automobile of claim 1, wherein the f-stop of the lens is f/2.8 and the sparse color filter array is a 3×3 sparse color filter array.

7. The automobile of claim 1, wherein an integration time of the camera about 15 milliseconds or less.

8. The automobile of claim 7, wherein the sparse color filter array is a 3×3 sparse color filter array.

9. The automobile of claim 1, wherein the lens is a fisheye lens.

10. The automobile of claim 9, wherein the image sensor includes a plurality of pixels and the sparse color filter array includes a repeating mosaic of color filters arranged in a pattern such that the mosaics are more highly concentrated near a center of the image sensor than near edges of the image sensor.

11. An automobile imaging system comprising:
    a camera including a lens and an image sensor having a sparse color filter array, the camera configured to generate image data based on light incident on the sensor, the lens having an f-stop higher than f/2.4;
    a controller configured to generate an image using the image data; and
    a display device configured to display the image.

12. The automobile imaging system of claim 11, wherein an integration time of the camera is about 30 milliseconds or less.

13. The automobile imaging system of claim 11, wherein the f-stop of the lens is higher than f/2.8.

14. The automobile imaging system of claim 13, wherein the sparse color filter array is a 4×4 sparse color filter array and an integration time of the camera is about 30 milliseconds.

15. The automobile imaging system of claim 14, wherein the f-stop of the lens is f/4.

16. The automobile imaging system of claim 11, wherein the f-stop of the lens is f/2.8 and the sparse color filter array is a 3×3 sparse color filter array.

17. The automobile imaging system of claim 11, wherein an integration time of the camera about 15 milliseconds or less.

18. The automobile imaging system of claim 17, wherein the sparse color filter array is a 3×3 sparse color filter array.

19. The automobile imaging system of claim 11, wherein the lens is a fisheye lens.

20. The automobile imaging system of claim 19, wherein the image sensor includes a plurality of pixels and the sparse color filter array includes a repeating mosaic of color filters arranged in a pattern such that the mosaics are more highly concentrated near a center of the image sensor than near edges of the image sensor.

* * * * *